Figure 1:
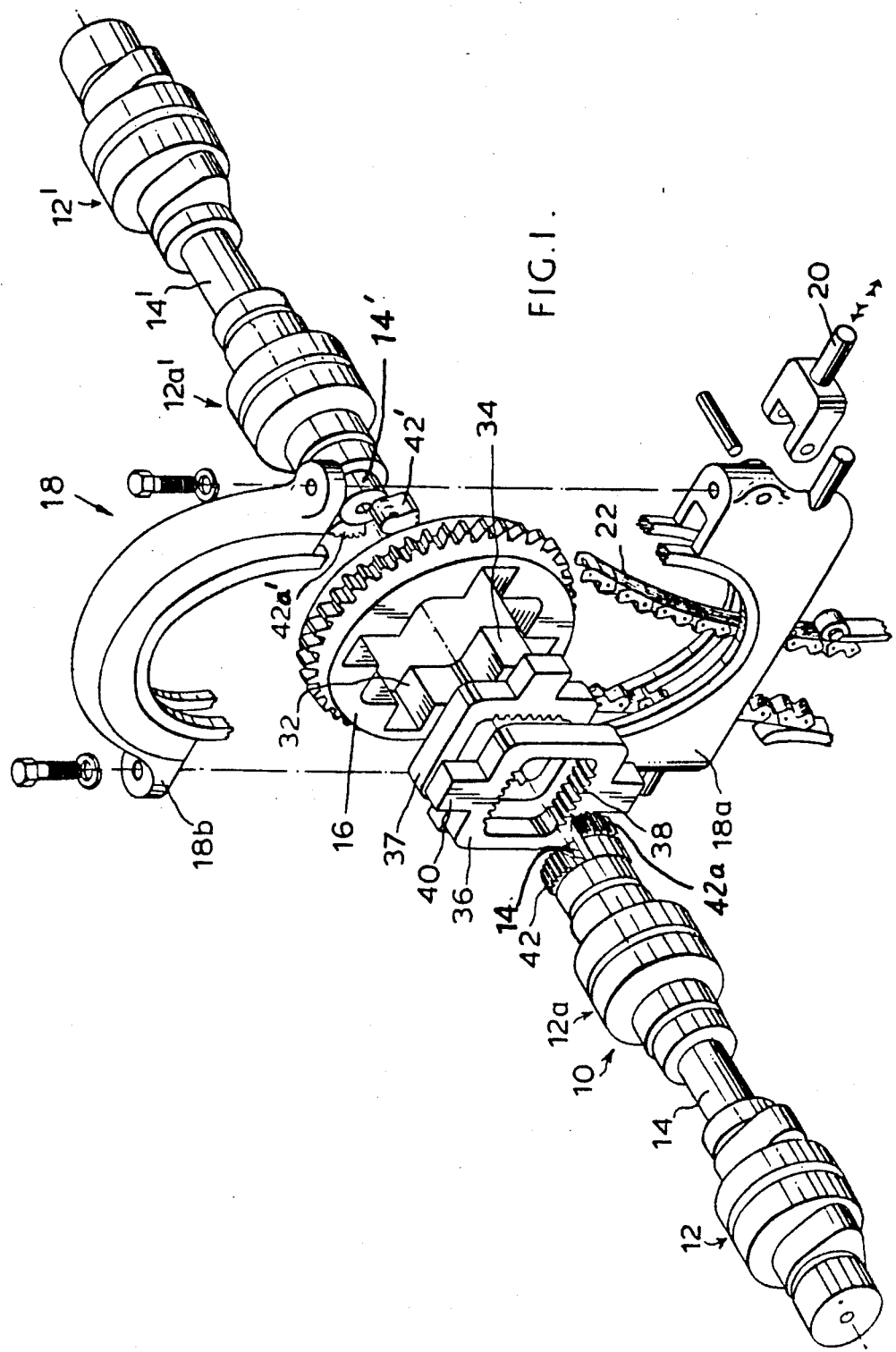

United States Patent [19]

Frost

[11] Patent Number: 4,723,517

[45] Date of Patent: Feb. 9, 1988

[54] CAM DRIVE MECHANISM

[75] Inventor: Derek Frost, Leigh-on-Sea, United Kingdom

[73] Assignee: Ford Motor Company, Dearborn, Mich.

[21] Appl. No.: 13,092

[22] Filed: Feb. 10, 1987

[30] Foreign Application Priority Data

Feb. 20, 1986 [GB] United Kingdom ............... 8604249

[51] Int. Cl.⁴ .............................................. F01L 1/02
[52] U.S. Cl. ............................. 123/90.31; 123/90.15; 123/90.17; 74/568 R; 74/838; 464/104; 464/105
[58] Field of Search ............... 123/90.17, 90.15, 90.31; 464/102, 104, 105; 74/838, 568 R

[56] References Cited

U.S. PATENT DOCUMENTS

| | | | |
|---|---|---|---|
| 1,826,703 | 10/1931 | Batts | 464/104 |
| 1,916,391 | 7/1933 | Shamberger | 464/105 |
| 2,065,648 | 12/1936 | Rime-Bruneau | 464/105 |
| 3,404,545 | 10/1968 | Walker | 464/104 |
| 3,886,805 | 6/1975 | Koderman | 123/90.31 |
| 4,480,607 | 11/1984 | Tsai et al. | 464/105 |

Primary Examiner—James C. Yeung
Attorney, Agent, or Firm—Robert E. McCollum; Clifford L. Sadler

[57] ABSTRACT

An engine driven camshaft cam is driven in a manner to superimpose a variable oscillation on the cam as it is rotatably driven in order to vary the period during which an associated valve is opened, the drive including an engine driven gear or sprocket journalled in a block whose axis is displaceable transversely to the axis of the cam, a slider member secured for rotation with the gear and guided for linear radial movement relative to the gear or sprocket, and a rack on the slider member engaged by a pinion coupled to the cam for oscillating the cam relative to the camshaft upon sliding movement of the slider in response to eccentrically displacing the axis of the gear.

4 Claims, 2 Drawing Figures

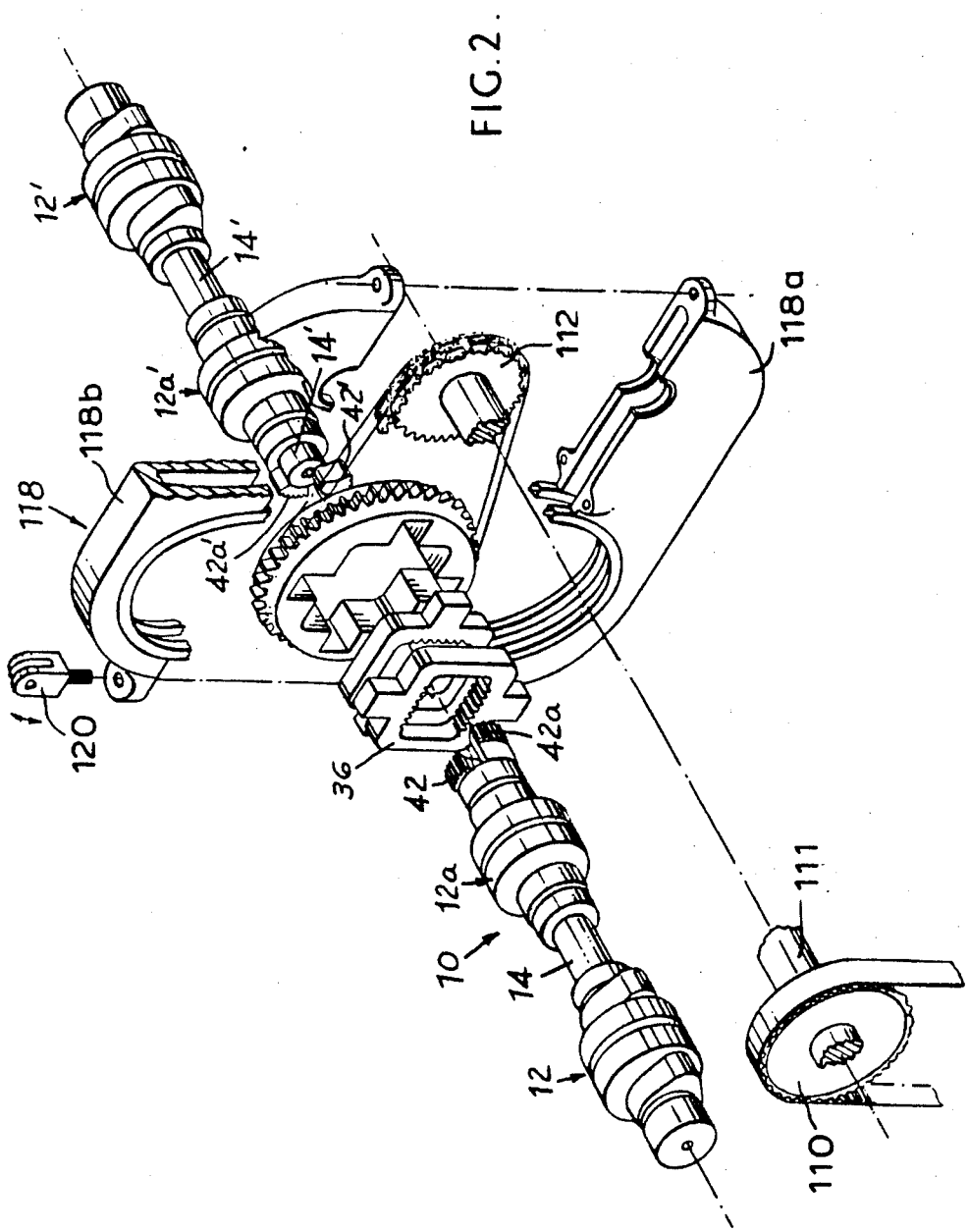

CAM DRIVE MECHANISM

The present invention relates to variable valve timing in an internal combustion engine and is a practical embodiment of the mechanism described in my copending application, U.S. Ser. No. 796,661, titled "Variable Valve Timing", filed on Nov. 8, 1986, U.S. Pat. No. 4,694,789.

Various proposals have been made in the past to achieve valve timing in which the duration of the events of the valves, that is the proportion of each cycle (expressed in terms of degrees of rotation of the engine crankshaft) during which the valves remain open, is variable with engine speed. This avoids the need to compromise since the optimum duration of the events varies with engine speed.

In a conventional engine in which a cam of predetermined profile rotates with constant angular velocity, the duration of the valve event is fixed. To achieve variable valve timing, the earlier proposals have attempted either to alter the effective profile of the cam with engine speed or to rotate a cam of fixed profile with variable angular velocity. The present invention is a development of the second of these proposals.

The invention seeks to provide a mechanism for rotating a cam shaft by superimposing an oscillation on the rotary motion of the cam shaft in such a manner as to achieve variable valve timing, the mechanism being of simple and robust construction and capable of being balanced to avoid excessive vibrational stresses being experienced by the drive train rotating the cam shaft from the crankshaft.

In accordance with a first aspect of the present invention, there is provided a mechanism for driving a cam in such a manner that a variable oscillation is superimposed on the rotation of the cam in order to vary the period during which an associated valve is opened. The mechanism comprises a gear or sprocket rotatable in synchronism with the engine crankshaft and journalled in a block which is displaceable in a direction transverse to the axis of the cam, a slider member guided for linear radial movement relative to the gear or sprocket, a rack on the slider member, and a pinion coupled to drive the cam and engaging the teeth of the rack.

Preferably, a balancing weight is driven by a pinion engaging a second rack on the slider member in order to balance the inertial forces acting on the drive train serving to rotate said gear or sprocket.

In accordance with a second aspect of the invention, there is provided a mechanism for driving two coaxial valve operting cams associated with different cylinders of an internal combustion engine which operate in antiphase in such a manner that a variable oscillation is superimposed on the rotation of the cams in order to vary the period during which the associated valves are opened, the mechanism comprising a gear or sprocket rotatable in synchronism with the engine crankshaft and journalled in a block which is displaceable transversely to the axis of the cams, a slider member guided for linear radial movement relative to the gear or sprocket, two racks on the slider member, and pinions fast in rotation with the respective cams and engaging the teeth of the respective racks.

In accordance with a further aspect of the invention, there is provided a mechanism for driving a plurality of coaxial valve operating cams associated with different cylinders of an internal combustion engine in which pairs of cylinders operate in antiphase, the cams being driven in such a manner that a variable oscillation is superimposed on the rotation of the cams in order to vary the period during which the associated valves are opened, the mechanism comprising a gear or sprocket rotatable in synchronism with the engine crankshaft and journalled in a block which is displaceable transversely to the axis of the cams, a plurality of slider members each guided for linear radial movement relative to the gear or sprocket, two racks on each slider member, and pinions fast in rotation with the respective cams and engaging the teeth of the racks, the pinions of corresponding cams of cylinders operating in antiphase being engagable with the racks of a common respective slider member or with the rack of another slider member that is acting in antiphase.

The invention will now be described further, by way of example, with reference to the accompanying drawings, in which:

FIG. 1 shows an exploded view of a mechanism in accordance with a first embodiment of the invention; and FIG. 2 shows a similar view of an alternative embodiment.

The mechanism shown in FIG. 1 comprises a camshaft 10 for a four-cylinder engine or engine block, which is formed with four sets of cams 12, 12a, 12' and 12a', each set of cams being associated with a respective one of the cylinders. The cam sets 12 and 12' are secured to shafts 14 and 14', while the sets 12a and 12a' are journalled about shafts 14, 14' so that the sets 12a and 12a' may undergo a limited degree of rotation relative to the cam sets 12 and 12', respectively.

The drive from the crankshaft (not shown) to the sets of cams is through a cog 16 journalled in a block 18. The block consists of two pieces, 18a, 18b, and is slidable relative to the cylinder head along an axis transverse to the camshaft axis. A control mechanism represented by a rod 20 serves to position the block 18 for the purpose of varying the valve timing. The cog 16 is driven by a toothed chain 22 which is suitably tensioned and passes around another cog (not shown) driven by the engine crankshaft.

The cog 16 is internally machined to define two slideways 32 and 34, disposed at right angles to one another and each serving to guide a respective one of two sliders 36, 37. Each slider is generally in the form of a square frame formed with two racks 38 on two of its parallel inner sides and arms 40 projecting from the square frame. The arms are received in matingly shaped recesses in one of the slideways 32, 34 so that the slider can move radially with respect to the axis of rotation of the cog 16.

Each of the racks 38 on the frames is associated with a different one of the same sets 12, 12a, 12' and 12a', and drives that set by means of a pinion segment 42, 42a, 42' and 42a', respectively, each of which engages that particular rack and is fast in rotation with the respective cam set. Pinion segments 42, 42' are fixed for rotation with extensions of shafts 14, 14', respectively, while pinion segments 42a, 42a' are fixed for rotation with axial extensions of the cam sets 12a, 12a', respectively. Each of the pinion segments extends over an angle of less than 180° to permit limited rotation relative to one another of the pairs of pinions. Also, the pinions of each pair 42, 42a, 42', 42a' are axially offset from one another so that whichever pinion in each set engages one of the sliders 36, 37, the other engages the other slider 37, 36.

When the axis of the cog 16 is coaxial with the axis of shaft 14 and the cam sets 12, then all of the cam sets, the sliders 36, 37, and the cog 16 rotate in unison with constant angular velocity, and the sliders do not move radially along the slideways.

If the axis of cog 16 is misaligned or made eccentric with respect to the axis of the shaft 14 and the cam sets, then as the cog 16 rotates, the sliders 37, 36 will oscillate along their respective slideways 32, 34. This oscillation of the sliders is transmitted by the rack and pinion couplings to the respective cam sets 12a and 12a' so that these also oscillate about their own axis at the same time as they are rotated. The resultant motion of the cam is a rotation with varying angular velocity. This has the effect of varying the valve timing to an extent determined by the eccentricity of the cog 16.

It is therefore possible to configure the cams for optimum timing of the events at high engine speeds when the cog 16 will be coaxial with the cam sets 12. With lower engine speeds, the cog is moved off axis to vary the event timing and provide improved performance as against an engine with fixed timing. The invention in this way enables optimization of the engine performance over an extended operating range.

A considerable torque is required to advance and retard the cam sets through the oscillation of the sliders and this creates a reaction force on the cog 16. Because, however, each slider is coupled to two cam sets operating in antiphase, the reaction forces from the different cam sets generally balance one another so that the chain 22 is not subjected to unacceptably high forces.

In any embodiment where only one cam set is connected to a slider, it is possible to achieve balancing by simultaneously driving a dummy shaft or weight, to counteract the inertial forces.

As described above, the mechanism separately times each cam set and this has resulted in the need for a split cam shaft. It is alternatively possible to drive a single cam shaft by means of a single mechanism of the invention, designed to superimpose a larger number of oscillations per rotation of the camshaft. However, this approach is less preferred as it increases the complexity of the mechanism and significantly increases the inertial forces acting on the mechanism.

The mechanism as shown in FIG. 1 cannot be employed in an existing engine design where no provision is made for centrally driving a camshaft. To enable the invention to be applied in an existing engine with modification only to the cylinder head, the embodiment shown in FIG. 2 may be employed.

This embodiment is generally similar to that of FIG. 1 and, therefore, will not be described in detail. The essential difference is that the drive from the crankshaft is at the front end of the engine, in the conventional manner. A camshaft pulley 110 is connected to a shaft 111 which drives a cog 112 journalled in a block 118. The latter is made in two pieces, which is analogous to the block 18 in FIG. 1. However, instead of being slidable on the cylinder head, the block 118 is rotatable about the axis of shaft 111. Rotation of block 118 is effected by a control unit represented schematically by a knuckle 120.

When the block carrying the cog 16 is pivoted, the phase of the valve event will be varied as well as its duration. Depending upon the angular relationship of the pivoting axis of block 118 relative to the cam axis, the pivotal movement can bring about advance or retard of the whole event at the same time as varying the duration of the event.

On twin cam engines, where two separate complete assemblies would be necessary, this feature would be desirable as it enables the phase overlap between the inlet and exhaust cams to be varied differently from the period reductions of the valves, thereby further optimizing the valve timing at lower engine speeds. With a single camshaft, the valve overlap change is a direct product of the event change and would fall short of the optimum requirement.

More particularly, on single cam engines, there is an optimum position for the oscillation and this will determine the best compromise between the inlet and exhaust events. With twin cams, both phase shift between the inlet and exhaust valves (valve overlap) and the periods of the events can be independently adjusted to optimize performance over the operating range of the engine.

While the invention has been shown and described in its preferred embodiments, it will be clear to those skilled in the arts to which it pertains that many changes and modifications may be made thereto without departing from the scope of the invention.

I claim:

1. An engine camshaft drive mechanism for driving at least one cam in a manner to impose a variable oscillation on the cam concurrent with rotation of the cam by the engine crankshaft in order to vary the opening period of an associated valve, comprising,
   a gear or sprocket rotatable in synchronism with the engine crankshaft and journalled in a block displaceable transversely to the axis of the cam for eccentrically locating the axis of the gear relative to the cam axis,
   a slider member rotatable with the gear and mounted for a linear radial movement relative to the gear,
   a rack on the slider member and a pinion coupled to the cam for driving the same and engagable with the rack whereby rotation of the gear subsequent to transverse displacement of the axis of the gear rotates the slider and cam at crankshaft speed and effects an additional rotation of the cam relative to the gear in response to movement of the pinion by the rack upon sliding radially of the slider.

2. A mechanism as claimed in claim 1, including a balancing weight driven by a second pinion engaging a second rack on the slider member for balancing the inertial forces acting on the drive train serving to rotate said gear or sprocket.

3. A mechanism as in claim 1, including two racks on the slider member and a pair of pinions fast in rotation with the respective cams and engaging the respective racks.

4. A mechanism as in claim 1, including means to superimpose a variable oscillation on the rotation of a plurality of coaxially mounted cams associated with different cylinders of the internal combustion engine in which pairs of cylinders operate in antiphase to vary the period during which the associated valves are opened, a second slider member guided for linear radial movement relative to the gear or sprocket, two racks on the second slider member, and pinions fast in rotation with each of the respective cams and engaging the teeth of the respective racks, the pinions of corresponding cams of cylinders operating in opposite phase to one another being engagable with the racks of a common respective slider member or with the rack of another sliding member that is acting in opposite phase.

* * * * *